United States Patent
Nakawaki

(10) Patent No.: US 10,484,552 B2
(45) Date of Patent: Nov. 19, 2019

(54) INFORMATION PROCESSING APPARATUS AND INFORMATION PROCESSING METHOD FOR CREATING WORKFLOW

(71) Applicant: CANON KABUSHIKI KAISHA, Tokyo (JP)

(72) Inventor: Jun Nakawaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/950,952

(22) Filed: Apr. 11, 2018

(65) Prior Publication Data

US 2018/0316808 A1   Nov. 1, 2018

(30) Foreign Application Priority Data

Apr. 28, 2017   (JP) .................................. 2017-089960

(51) Int. Cl.
*H04N 1/00*   (2006.01)

(52) U.S. Cl.
CPC ..... *H04N 1/00474* (2013.01); *H04N 1/00949* (2013.01); *H04N 2201/0094* (2013.01)

(58) Field of Classification Search
CPC ........... H04N 1/00474; H04N 1/00949; H04N 2201/0094; G06F 3/1205
See application file for complete search history.

(56) References Cited

U.S. PATENT DOCUMENTS

| | | | |
|---|---|---|---|
| 2008/0154685 A1* | 6/2008 | Matsuda | G06Q 10/06 705/7.27 |
| 2009/0174897 A1* | 7/2009 | Sato | H04N 1/00411 358/1.15 |
| 2012/0110066 A1* | 5/2012 | Furuta | G06F 3/122 709/203 |

FOREIGN PATENT DOCUMENTS

JP   2014134872 A   7/2014

* cited by examiner

*Primary Examiner* — Kent Yip
(74) *Attorney, Agent, or Firm* — Canon U.S.A., Inc. IP Division

(57) ABSTRACT

An information processing apparatus displays a creation screen and adds display information. The creation screen is for a user to create a workflow by combining function providers. The function providers includes a function provider having a setting interface to call a setting screen to perform a setting of a corresponding function, and an execution interface to execute the corresponding function. In a case where a setting interface of a function provider added to the workflow refers to a result of an execution by an execution interface of a preceding function provider, display information is automatically added to a definition file for the workflow. The automatically added display information is information to display a message to prompt the user to standby during the execution by the execution interface of the preceding function provider.

15 Claims, 18 Drawing Sheets

FIG.5

423 FUNCTION PROVIDER INFORMATION TABLE

| No | FUNCTION PROVIDER ID | NAME | FUNCTION TYPE ID | FUNCTION PROVIDER INTERFACE |
|---|---|---|---|---|
| 1 | NORMAL_SCAN | NORMAL SCAN | SCAN | IScanProvider |
| 2 | EASY_SCAN | SIMPLE SCAN | SCAN | IScanProvider |
| 3 | OCR_EMBEDDED | EMBEDDED OCR | OCR | IOcrProvider |
| 4 | OCR_WEB | Web OCR | OCR | IOcrProvider |
| 5 | MAIL_SEND | MAIL TRANSMISSION | SEND_FILE | ISendFileProvider |
| ... | ... | ... | ... | ... |

FIG.6

424/540 FUNCTION PROVIDER INTERFACE DEFINITION

```
1401 —  public interface IScanProvider {
              public boolean showSettingUI(Parameter);
              public Document doScan(Parameter);
        }

1402 —  public interface IOcrProvider {
              public String doOCR(Document, Parameter);
        }

1403 —  public interface ISendFileProvider {
              public boolean showSettingUI(Parameter);
              public boolean doSend(Document, String, Parameter);
        }
```

FIG.8

530 FUNCTION PROVIDER I/F INFORMATION TABLE

| FUNCTION TYPE ID | FUNCTION TYPE NAME | FUNCTION PROVIDER INTERFACE | SETTING INTERFACE | EXECUTION INTERFACE |
|---|---|---|---|---|
| SCAN | SCAN | IScanProvider | showSettingUI | doScan |
| OCR | OCR | IOcrProvider | — | doOCR |
| SEND_FILE | TRANSMIT | ISendFileProvider | showSettingUI | doSend |
| ... | ... | ... | ... | ... |

FIG.10

440 WORKFLOW DEFINITION FILE

```
810  <Workflow id="H name="PERFORM SCAN&OCR AND TRANSMIT">
820    <FP no="1" type="SCAN">
821      <Condition>...
         </Condition>
822      <Action no="1" method="showSettingUI">
            <Parameter>...
            </Parameter>
         </Action>
823      <Action no="3" method="doScan">
            <Parameter>...
            </Parameter>
            <Output type="Document" id="foo" />
         </Action>
       </FP>

830    <FP no="2" type="OCR">
         <Condition>...
         </Condition>
831      <Action no="4" method="doOCR">
            <Input type="Document" src="foo" />
            <Parameter>...
            </Parameter>
            <Output type="String" id="bar" />
         </Action>
       </FP>

840    <FP no="3" type="SEND">
         <Condition>...
         </Condition>
841      <Action no="2" method="showSettingUI">
            <Parameter>...
            </Parameter>
         </Action>
842      <Action no="5" method="doSend">
            <Input type="Document" src="foo" />
            <Input type="String" src="bar" />
            <Parameter>...
            </Parameter>
         </Action>
       </FP>
     </Workflow>
```

FIG.11

440 WORKFLOW DEFINITION FILE

```
910 — <Workflow id="H name="PERFORM SCAN&OCR AND TRANSMIT">
920 —   <FP no="1" type="SCAN">
          <Condition>...
          </Condition>
921 —     <Action no="2" method="doScan">
            <Parameter>...
            </Parameter>
            <Output type="Document" id="foo" />
          </Action>
        </FP>

930 —   <FP no="2" type="OCR">
          <Condition>...
          </Condition>
931 —     <Action no="3" method="doOCR">
            <Input type="Document" src="foo" />
            <Parameter>...
            </Parameter>
            <Output type="String" id="bar" />
          </Action>
        </FP>

940 —   <FP no="3" type="SEND">
          <Condition>...
          </Condition>
941 —     <Action no="1" method="showSettingUI">
            <Parameter>...
            </Parameter>
          </Action>
942 —     <Action no="4" method="doSend">
            <Input type="Document" src="foo" />
            <Input type="String" src="bar" />
            <Parameter>...
            </Parameter>
          </Action>
        </FP>
      </Workflow>
```

FIG.12

440 WORKFLOW DEFINITION FILE

```
1010 ─ <Workflow id="H name="PERFORM SCAN&OCR AND TRANSMIT">
1020 ─   <FP no="1" type="SCAN">
           <Condition>...
           </Condition>
1021 ─     <Action no="1" method="showSettingUI">
             <Parameter>...
             </Parameter>
           </Action>
1022 ─     <Action no="2" method="doScan">
             <Parameter>...
             </Parameter>
             <Output type="Document" id="foo" />
           </Action>
         </FP>

1030 ─   <FP no="2" type="OCR">
           <Condition>...
           </Condition>
1031 ─     <Action no="3" method="doOCR">
             <Input type="Document" src="foo" />
             <Parameter>...
             </Parameter>
1032 ─       <Output type="String" id="bar" />
           </Action>
         </FP>

1040 ─   <FP no="3" type="SEND">
           <Condition>...
           </Condition>
1041 ─     <Action no="4" method="showSettingUI">
1042 ─       <Input type="String" src="bar" />
             <Parameter>
1043 ─         <Property id="FAX_NUMBER" value="%bar%">
                 ...
             </Parameter>
           </Action>
1044 ─     <Action no="5" method="doSend">
             <Input type="Document" src="foo" />
             <Parameter>...
             </Parameter>
           </Action>
         </FP>
1045 ─   <Panels>
1046 ─     <Panel from="2" to="3">
             <Message>After this, a setting for "facsimile transmission" is required. Please wait for a moment.</Message>
           </Panel>
         </Panels>
       </Workflow>
```

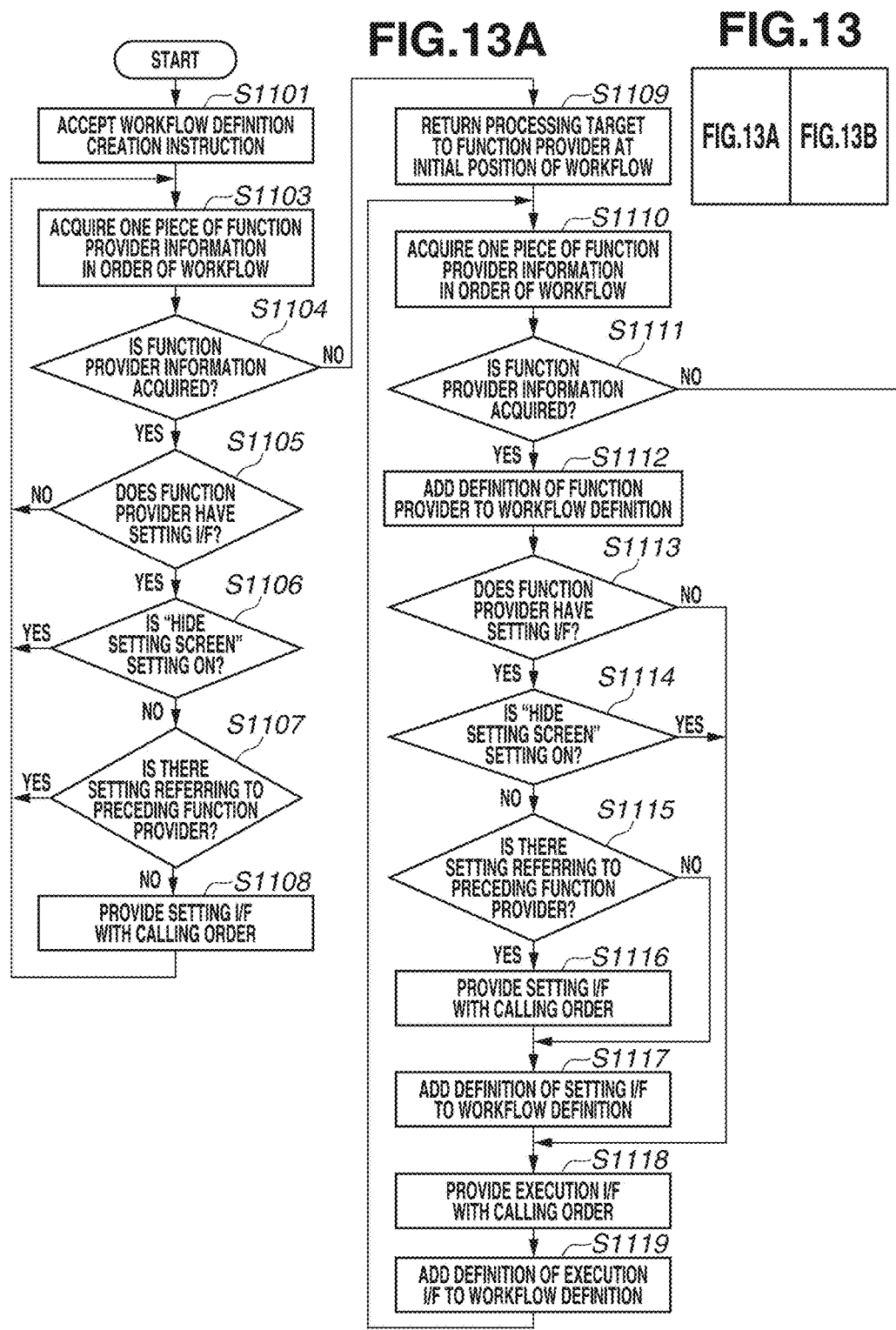

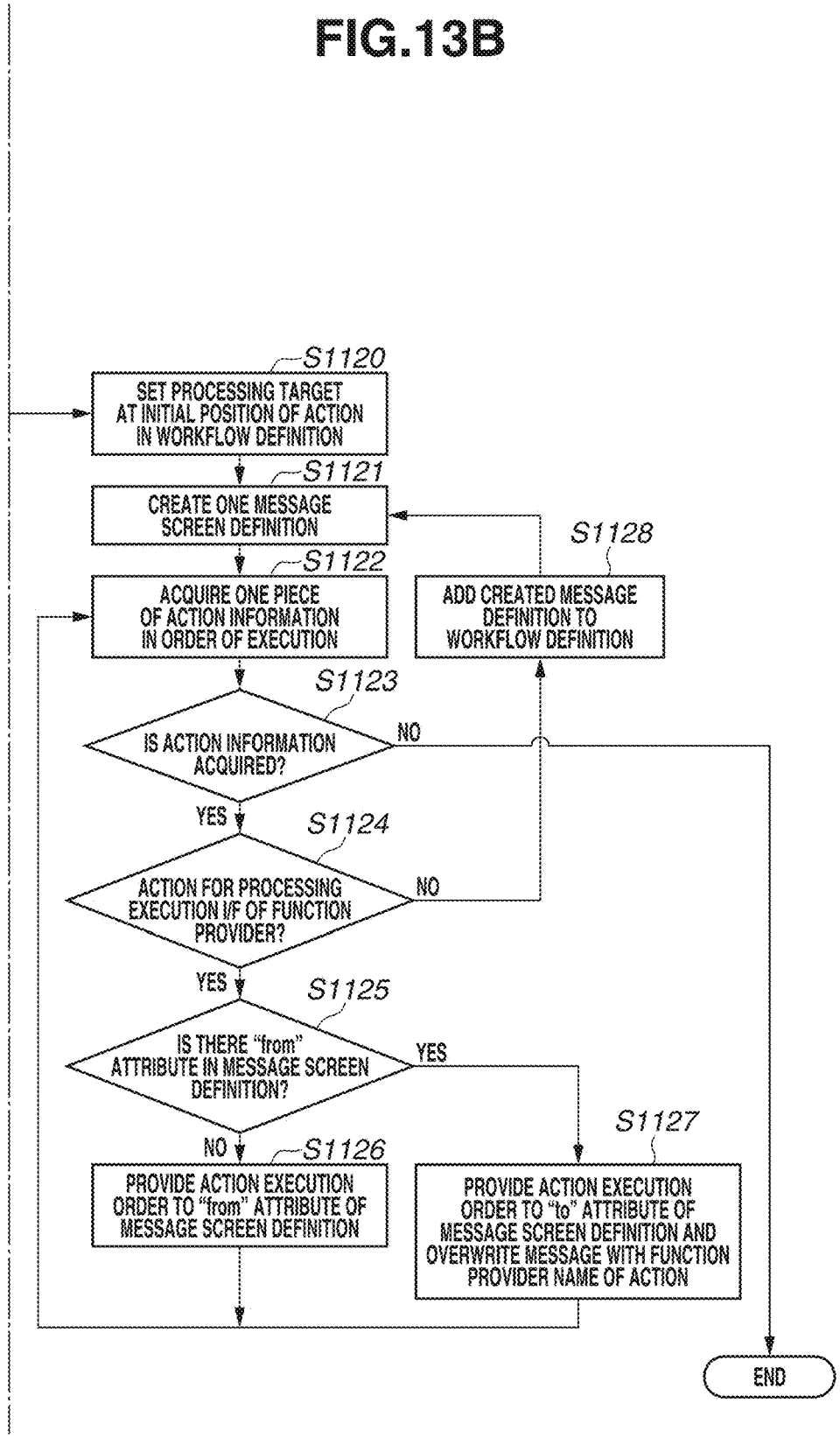

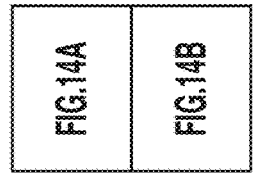
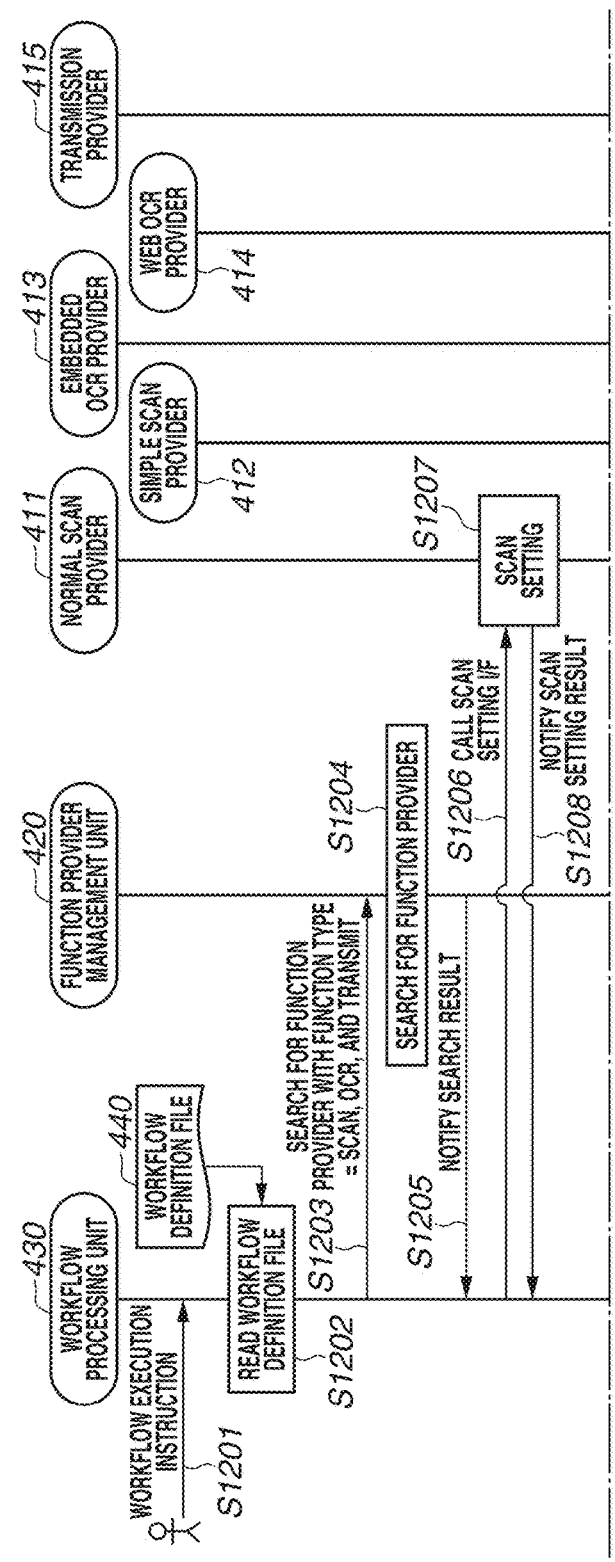
FIG.14A

INFORMATION PROCESSING APPARATUS AND INFORMATION PROCESSING METHOD FOR CREATING WORKFLOW

BACKGROUND OF THE INVENTION

Field of the Invention

The present disclosure relates to information processing for creating a workflow.

Description of the Related Art

In recent years, a system capable of extending functions of an image forming apparatus installed in an office has been in widespread use. Functions for extending the functions of the image forming apparatus (hereinafter, the functions are referred to as extension functions) are realized by software (hereinafter referred to as extension software). Extension functions may be added not only when shipped from a factory but also when the system is in operation after installation. In particular, extension software created for a certain purpose is referred to as application software (hereinafter referred to as an application). Each application may implement processing by using functions, such as a facsimile, a scanner, and a printer, which are included in the image forming apparatus. The image forming apparatus is configured in such a manner that a user can install therein a plurality of applications according to intended use.

Japanese Patent Application Laid-Open No. 2014-134872 discusses a technique in which a user defines a series of processes (hereinafter referred to as a workflow) by arbitrarily combining a plurality of processes for input, conversion, and output, and charging is performed based on charging rules specific to each process.

In the technique discussed in Japanese Patent Application Laid-Open No. 2014-134872, when the user selects a workflow, a flow definition accepting unit accepts setting conditions necessary for each process of the selected workflow, creates flow definition information, and transmits the flow definition information to a processing server to request the processing server to execute the workflow. In other words, in the technique discussed in Japanese Patent Application Laid-Open No. 2014-134872, all conditions necessary for each process of the workflow are preliminarily set before the server is requested to execute the workflow.

However, depending on the processing content of the workflow, it may be difficult to preliminarily set all conditions before execution of the workflow. For example, in the case of creating a workflow by combining three processes of "scan", "optical character recognition (OCR)", and "transmit", assume that there is a workflow for setting a transmission destination number in the process of "transmit" when the user refers to the OCR result obtained by performing OCR of a scanned image. In such a case, there is a need to obtain the OCR result before displaying a transmission setting screen for setting the transmission destination number in the process of "transmit". The transmission setting screen cannot be displayed before the workflow is executed. Accordingly, in the workflow of this example, the user needs to stand by in front of the apparatus until the scan process and the OCR process are completed.

On the other hand, some processes do not require the condition setting by the user. In such processes, no setting screen is displayed and thus there is no need for the user to stand by in front of the apparatus until the processing of the workflow is completed. In other words, in order to determine whether there is a need for the user to stand by in front of the apparatus, it is necessary for the user to grasp the type of a setting screen to be displayed in the workflow that is instructed to be executed, and to grasp when the setting screen is displayed.

SUMMARY OF THE INVENTION

According to an aspect of the present invention, an information processing apparatus includes one or more processors, and memory storing instructions that, when executed by the one or more processors, cause the information processing apparatus to perform operations including: displaying a creation screen for a user to create a workflow by combining a plurality of function providers, wherein the plurality of function providers includes a function provider having a setting interface to call a setting screen to perform a setting of a corresponding function, and an execution interface to execute the corresponding function, and adding display information, wherein, in a case where a setting interface of a function provider added to the workflow refers to a result of an execution by an execution interface of a preceding function provider, the display information is automatically added to a definition file for the workflow, and wherein the automatically added display information is information to display a message to prompt the user to standby during the execution by the execution interface of the preceding function provider.

Further features of the present invention will become apparent from the following description of embodiments with reference to the attached drawings.

BRIEF DESCRIPTION OF THE DRAWINGS

FIG. 5 illustrates an example of a function provider information table.

FIG. 6 illustrates an example of function provider interface definitions.

FIG. 8 illustrates an example of a function provider interface (I/F) table.

FIG. 10 illustrates a specific description example of a workflow definition file (No. 1).

FIG. 11 illustrates a specific description example of the workflow definition file (No. 2).

FIG. 12 illustrates a specific description example of the workflow definition file (No. 3).

FIG. 13 includes FIGS. 13A and 13B which are a flowchart illustrating an example of information processing for creating a workflow definition.

DESCRIPTION OF THE EMBODIMENTS

Embodiments will be described below with reference to the drawings.

Figure 1:
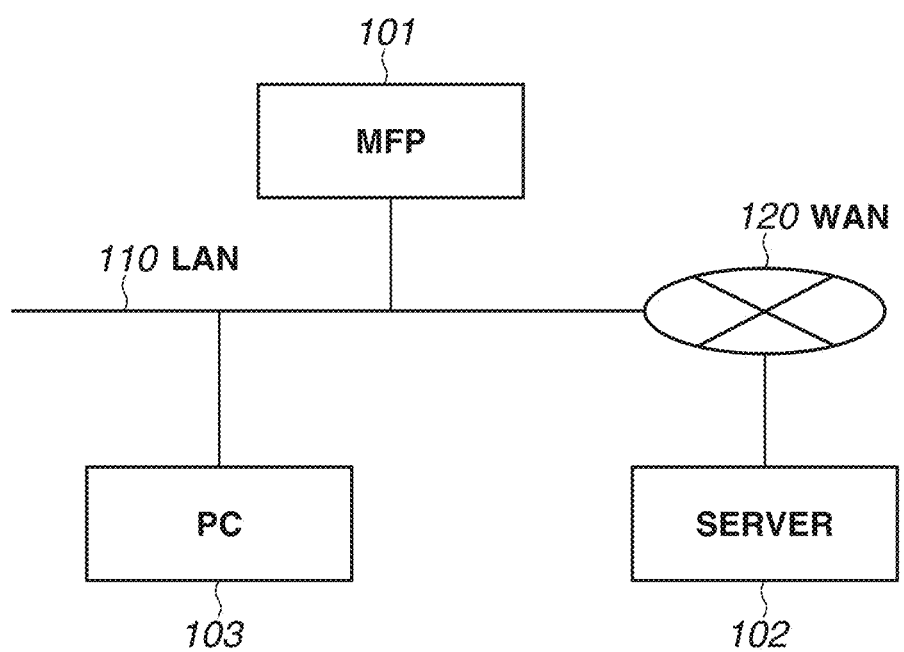
FIG. 1 is a block diagram illustrating an example of a system configuration of an image processing system.

FIG. 1 illustrates a system configuration example of an image processing system. The image processing system includes a multifunction peripheral (MFP) 101 and a personal computer (PC) 103, which are connected via a local area network (LAN) 110, and a server 102 connected to each of the MFP 101 and the PC 103 via a wide area network (WAN) 120. Each apparatus on the LAN 110 and each apparatus on the WAN 120 can communicate with each other via the corresponding network. FIG. 1 is a typical network configuration example. Each apparatus may be located on the LAN 110 or the WAN 120.

The MFP 101 is an image forming apparatus including a scanner and a printer. In addition, the MFP 101 has a software platform for adding and executing execution software to operate on the apparatus. The PC 103 is a terminal device for business use. Software for creating a definition file for a workflow that operates on the MFP 101 (the software is hereinafter referred to as a flow creation tool) operates on the PC 103. The server 102 performs various processes in cooperation with the MFP 101. For example, the server 102 is a file server that receives image data from the MFP 101, or a web application server that receives a processing request from the MFP 101 and executes optical character recognition (OCR) processing. The number of servers is not limited to one. A plurality of servers may be placed according to predetermined use.

Figure 2:
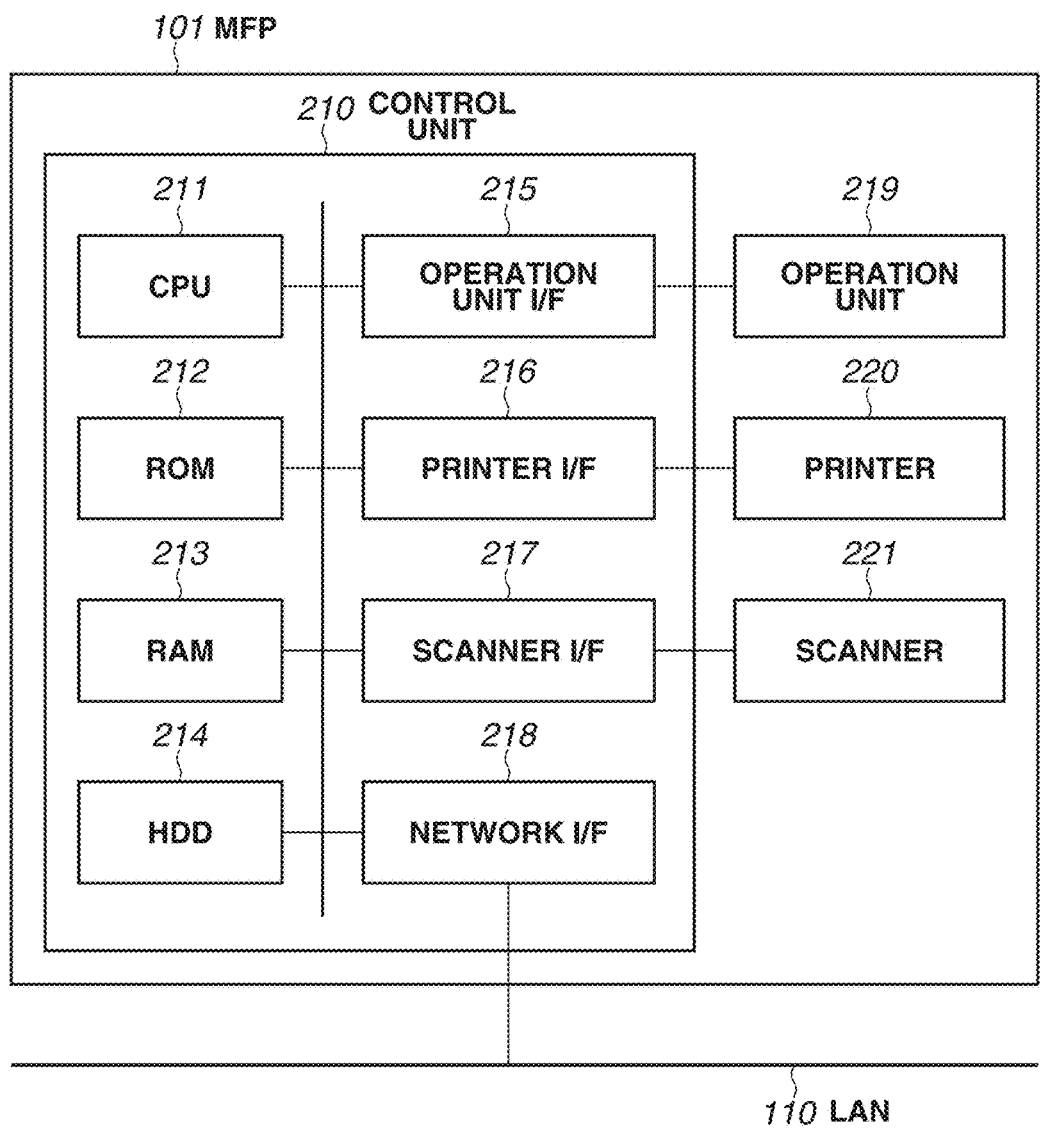
FIG. 2 is a block diagram illustrating an example of a hardware configuration of a multifunction peripheral (MFP).

FIG. 2 illustrates a hardware configuration of the MFP 101. A control unit 210 including a central processing unit (CPU) 211 controls the overall operation of the MFP 101. The CPU 211 reads control programs stored in a read-only memory (ROM) 212 or a hard disk drive (HDD) 214 and executes various control processes such as reading control and transmission control. A random access memory (RAM) 213 is used as a temporary storage area such as a main memory or work area for the CPU 211. The HDD 214 stores image data and various programs including installed extension software.

An operation unit interface (I/F) 215 connects the control unit 210 and an operation unit 219 to each other. The operation unit 219 includes a liquid crystal display unit including a touch panel function, a keyboard, and the like.

A printer I/F 216 connects the control unit 210 and a printer 220 to each other. The image data to be printed by the printer 220 is transferred from the control unit 210 to the printer 220 via the printer I/F 216 and is printed on a recording medium in the printer 220.

A scanner I/F 217 connects the control unit 210 and a scanner 221 to each other. The scanner 221 reads an image formed on an original document to generate image data, and outputs the image data to the control unit 210 via the scanner I/F 217. A network I/F 218 connects the control unit 210 (MFP 101) to the LAN 110. The network I/F 218 transmits and receives various kinds of information to and from another apparatus on the LAN 110 or the WAN 120.

The CPU 211 executes processing based on the programs stored in the ROM 212 or the HDD 214, thereby implementing a software configuration of the MFP 101 in FIG. 4 to be described below and processing in the sequence diagram in FIGS. 14A and 14B.

Figure 3:
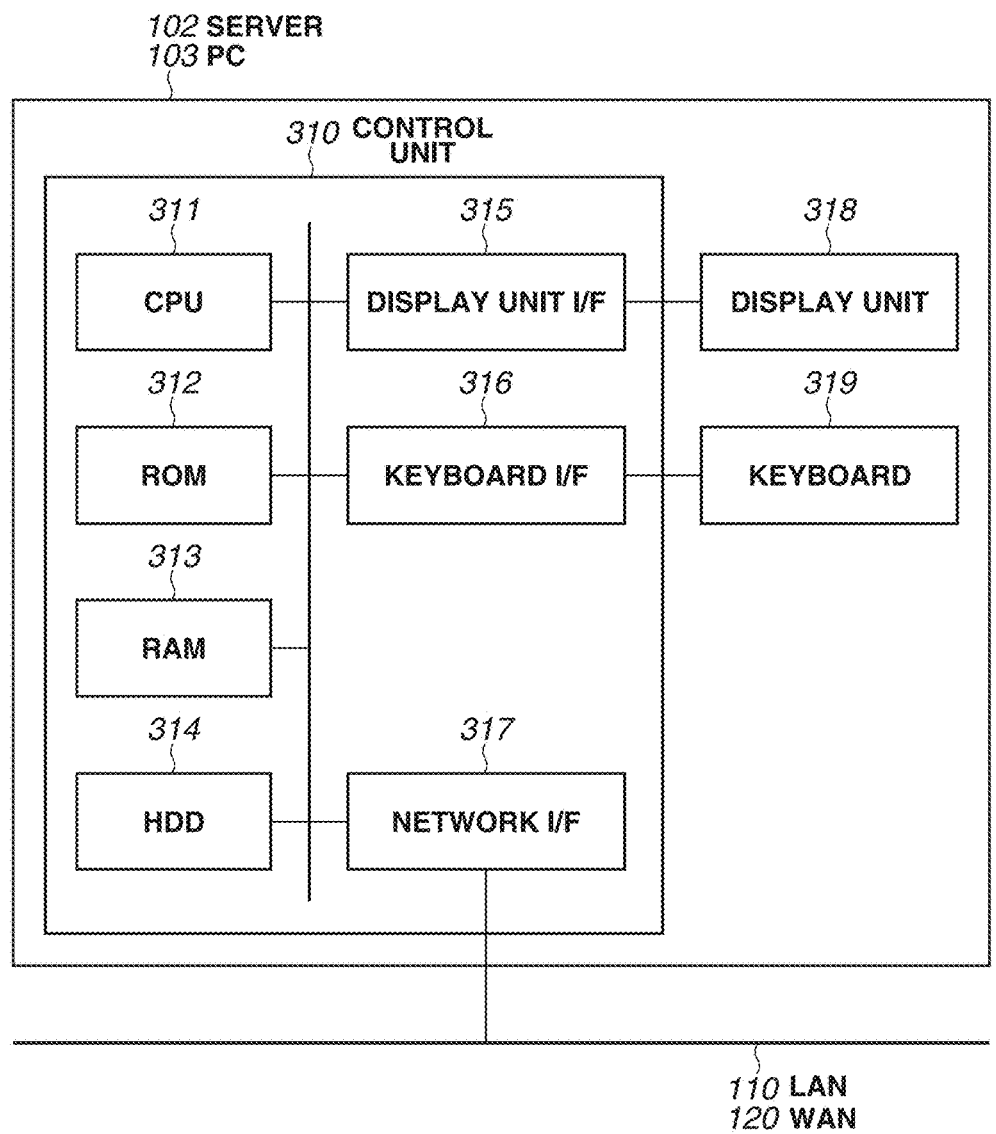
FIG. 3 is a block diagram illustrating an example of a hardware configuration of each of a server and a personal computer (PC).

FIG. 3 illustrates an example of a hardware configuration of each of the server 102 and the PC 103. A control unit 310 including a CPU 311 controls the overall operation of the apparatus. The CPU 311 reads the control programs stored in a ROM 312 or an HDD 314 and executes various control processes. A RAM 313 is used as a temporary storage area such as a main memory or work area for the CPU 311. The HDD 314 stores various programs and data.

A display unit I/F 315 connects the control unit 310 and a display unit 318 to each other. A keyboard I/F 316 connects the control unit 310 and a keyboard 319 to each other. The CPU 311 recognizes an instruction from a user via the keyboard 319 and causes a screen displayed by the display unit 318 to be shifted in accordance with the recognized instruction.

A network I/F 317 connects the control unit 310 to the LAN 110 or the WAN 120. The network I/F 317 transmits and receives various kinds of information to and from another apparatus on the LAN 110 or the WAN 120. The CPU 311 of the server 102 executes processing based on the programs stored in the ROM 312 or the HDD 312 of the server 102, thereby implementing functions of the server 102 to be described below. The CPU 311 of the PC 103 executes processing based on the programs stored in the ROM 312 or the HDD 314 of the PC 103, thereby implementing a software configuration of the PC 103 in FIG. 7 to be described below and processing of the flowchart in FIGS. 13A and 13B.

Figure 4:
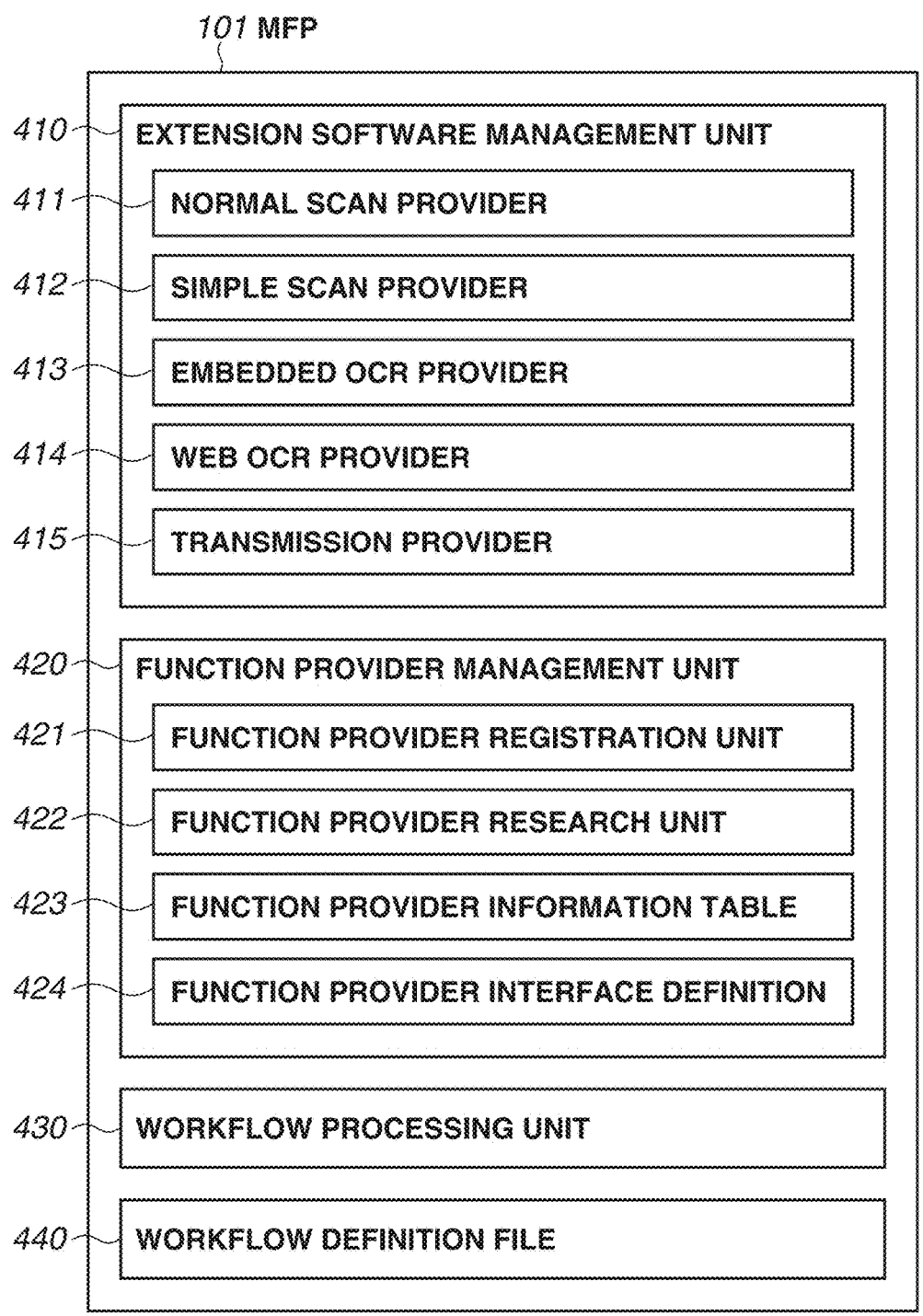
FIG. 4 illustrates an example of a software configuration of the MFP.

FIG. 4 illustrates an example of the software configuration of the MFP 101. A software management unit 410 is a software platform for causing software to operate on the MFP 101. Referring to FIG. 4, five pieces of software of 411 to 415 are installed in the MFP 101 as function providers.

A function provider is not an application but is a type of software. A single application includes a series of complete processes ranging from an input to an output. On the other hand, a single function provider represents software for providing a specific function, such as an input or an output. To carry out a series of complete processes ranging from an input to an output, it is necessary to combine a plurality of function providers.

For example, in the case of providing the user with a function of "scanning an image and transmitting the image after preview display of the image", three functions of "scan", "preview", and "transmit" are implemented by a single application. In the case of using function providers, three function providers, i.e., "a function provider for implementing a scan function", "a function provider for implementing a preview function", and "a function provider for implementing a transmission function" are required. To execute the three function providers as a series of processes, a workflow processing unit 430, which is described below, is required.

Each application registers the application itself on a menu screen for calling functions (e.g., a copy function and a facsimile transmission function), which are originally included in the MFP 101, so that the application is displayed side by side with these functions. The application is called by a user's instruction from the menu screen. On the other hand, each function provider registers the function provider itself in a function provider management unit 420, which is described below, instead of registering the function provider on the menu screen. The function provider is called by an instruction from the workflow processing unit 430 via the function provider management unit 420. To execute a workflow, the workflow processing unit 430 uses a menu item to be displayed on the menu screen so as to correspond to a workflow definition file to be described below.

Each function provider is programmed so as to satisfy rules (hereinafter referred to as a function provider interface) specified by the function provider management unit 420.

The function provider interface is a software interface where rules at the time when exchange of data between pieces of software is performed are determined. The function provider interface is determined for each type of functions (hereinafter referred to as a function type) provided by the function provider. The function provider is called from the workflow processing unit 430 based on the function provider interface.

A single function provider may include various types of interfaces in accordance with predetermined use. For example, as for the function provider for implementing the scan function, various types of interfaces can be prepared for each purpose, such as "displaying a scan setting screen" and "executing a scan job".

Various types of function providers can be installed in the MFP 101. Various function providers of different function types may be installed, or various function providers of the same function type may be installed. Since the functions providers of the same function type include the same function provider interface, exchange of data between pieces of software or extension software can be made in the same manner, as long as the function providers are the same function type.

The normal scan provider 411 and the simple scan provider 412 are function providers (function type=scan) that provide the scan function. The function providers having the function type "scan" are collectively referred to as a scan provider. The scan provider implements the function provider interface (scan provider interface) defined for the function provider having the function type "scan". The normal scan provider 411 includes a scan setting screen for general users. On the other hand, the simple scan provider 412 includes a scan setting screen for beginners who are unfamiliar with the operation of the MFP 101.

The embedded OCR provider 413 and the web OCR provider 414 are function providers (function type=OCR) that provide the OCR function. The function providers having the function type "OCR" are collectively referred to as an OCR provider. The OCR provider implements the function provider interface (OCR provider interface) defined for the function provider having the function type "OCR". The embedded OCR provider 413 provides the OCR function by executing character recognition processing on the MFP 101. On the other hand, the web OCR provider 414 calls character recognition processing provided by an external web server, e.g., the server 102, via a web browser 450, thereby providing the OCR function.

The transmission provider 415 is a function provider (function type=file transmission) that provides the transmission function. The transmission provider implements the function provider interface (file transmission provider interface) defined for the function provider having the function type "file transmission".

Each function provider implements the function provider interface defined for the function type of the function provider itself, even when no other function providers having the same function type are present in the MFP 101.

The five function providers 411 to 415 described above are merely examples. Various function providers may be added to the MFP 101 or deleted from the MFP 101 as extension software.

The function provider management unit 420 is software for managing the function provider installed in the MFP 101. The function provider management unit 420 includes a function provider registration unit 421, a function provider searching unit 422, a function provider information table 423, and a function provider interface definition 424.

The function provider registration unit 421 receives a request from each function provider and registers, in the function provider information table 423, information about the function type of each function provider and values that can be set. Each function provider registers the function provider itself in the function provider registration unit 421 when the function provider is installed in the MFP 101 and is thus in an execution state.

The function provider searching unit 422 receives a search condition for the function provider from the workflow processing unit 430, which is described below, and specifies the function provider based on the information about the function provider information table 423. Since the function provider searching unit 422 specifies one function provider as a search result, when a plurality of function providers that match the search condition is present, the function provider with a highest priority is obtained as the search result. The function provider interface definition 424 defines the function provider interface.

The workflow processing unit 430 executes a series of processes by combining a plurality of function providers in accordance with a workflow definition file 440 which is described below. Assume that, in the present embodiment, a workflow represents a series of processes as a combination of a plurality of function providers. A workflow to be executed according to the present embodiment is configured in such a manner that a function provider is called and completed and after that the subsequent provider is called. However, the configuration according to the present embodiment is not limited to this. A workflow may be configured in such a manner that the subsequent function provider is called and executed in parallel with the current function provider before calling of the function provider is completed. For example, in a workflow that treats data composed of a plurality of pages, the subsequent function provider may be called for each page without waiting for the end of processing for all pages.

The workflow definition file 440 defines information about calling of a function provider, such as a search condition for the function provider called by the workflow processing unit 430, a calling order, and a setting value to be applied to the called function provider. Referring to FIG. 4, one workflow definition file is defined as an example. However, the number of workflow definition files is not limited to one. A plurality of workflow definition files may be present on the MFP 101.

FIG. 5 is a table illustrating an example of the function provider information table 423. The function provider information table 423 holds information about a function provider, such as a function provider ID for uniquely specifying the function provider, the name of the function provider, the function type, and the function provider interface. The function provider information table 423 is stored in, for example, the ROM 212 or the HDD 214 of the MFP 101.

FIG. 6 illustrates an example of each of function provider interface definitions 424 and 540. In the present embodiment, the function provider interface is represented by a program source code format, but instead other formats may be used. A scan provider interface definition 1401 defines two interfaces of "showSettingUI" and "doScan". Scan providers include two interfaces defined in the scan provider interface definition 1401. "showSettingUI" represents a setting interface for displaying a setting screen for scan setting. The setting interface "showSettingUI" receives a Parameter and returns a result as boolean (true-false value). The setting interface "showSettingUI" returns "true" when the user enters the scan setting, and returns "false" when the user cancels the scan setting. The Parameter is a setting value for calling an interface and is defined in the workflow definition file 440. "doScan" represents an execution interface for executing scan processing. The execution interface receives a Parameter and returns a result in a data format "Document". The execution interface "doScan" executes scanning using the value set by the user in "showSettingUI", or the setting value designated by the Parameter.

Similarly, an OCR provider interface definition 1402 is set. Assume that the OCR provider interface 1402 includes an execution interface "doOCR" for executing OCR processing and does not include a setting interface for displaying a setting screen. A file transmission provider interface definition 1403 is set. The file transmission provider interface definition 1403 includes a setting interface "showSettingUI" for displaying the setting screen for transmission setting, e.g., a setting of a transmission destination, and an execution interface "doSend" for executing file transmission processing. In this manner, the function provider interface definition defines interfaces (name, input, output) included in each function provider.

Figure 7:
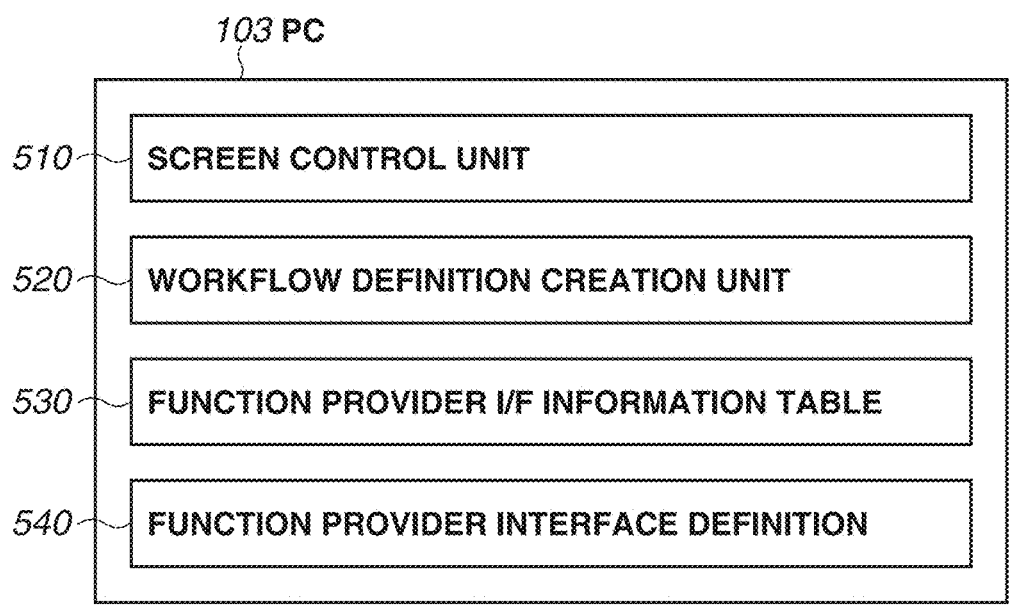
FIG. 7 illustrates a software configuration of the PC.

FIG. 7 illustrates an example of the software configuration of the PC 103.

A screen control unit 510 controls a screen display of flow creation tools. A workflow definition creation unit 520 creates a workflow definition used for the MFP 101 and stores the workflow definition in a file. A function provider I/F information table 530 is a table storing information about the function provider interface included in each function provider and is stored in the HDD 314. The function provider interface definition 540 is the same as the function provider interface definition 424 for the MFP 101.

FIG. 8 is a table illustrating an example of the function provider I/F information table 530. The function provider I/F information table 530 holds the function type ID of the function provider, the name of the function type, the function provider interface, the setting interface, the execution interface, and the like. The setting interface is a function provider interface that is included in the function provider to call a setting screen. The execution interface is a function provider interface that is included in the function provider to call execution processing.

The example of FIG. 8 defines that each of the scan provider and the transmission provider includes a setting interface and an execution interface, and that the OCR provider includes only the execution interface.

Figure 9A:
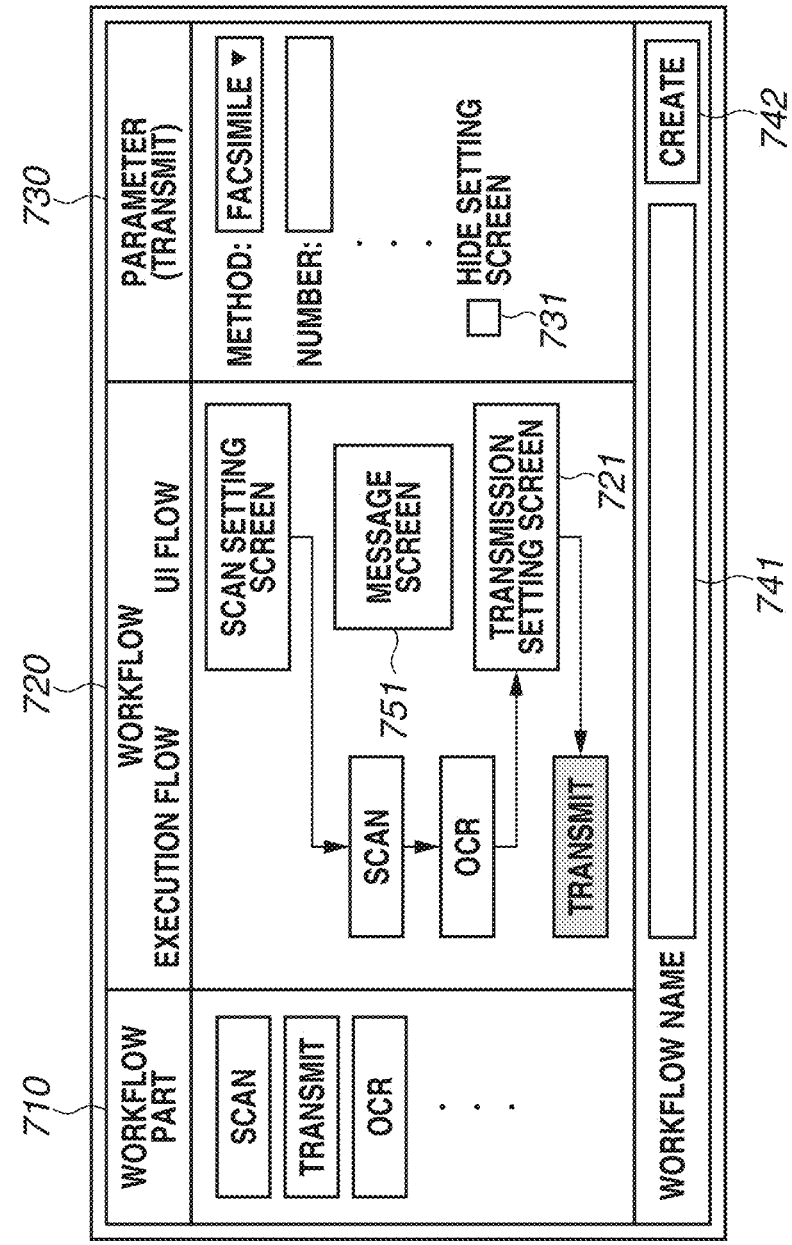
FIG. 9A illustrates an example of a screen on which flow creation tools are displayed (No. 1).
Figure 9B:
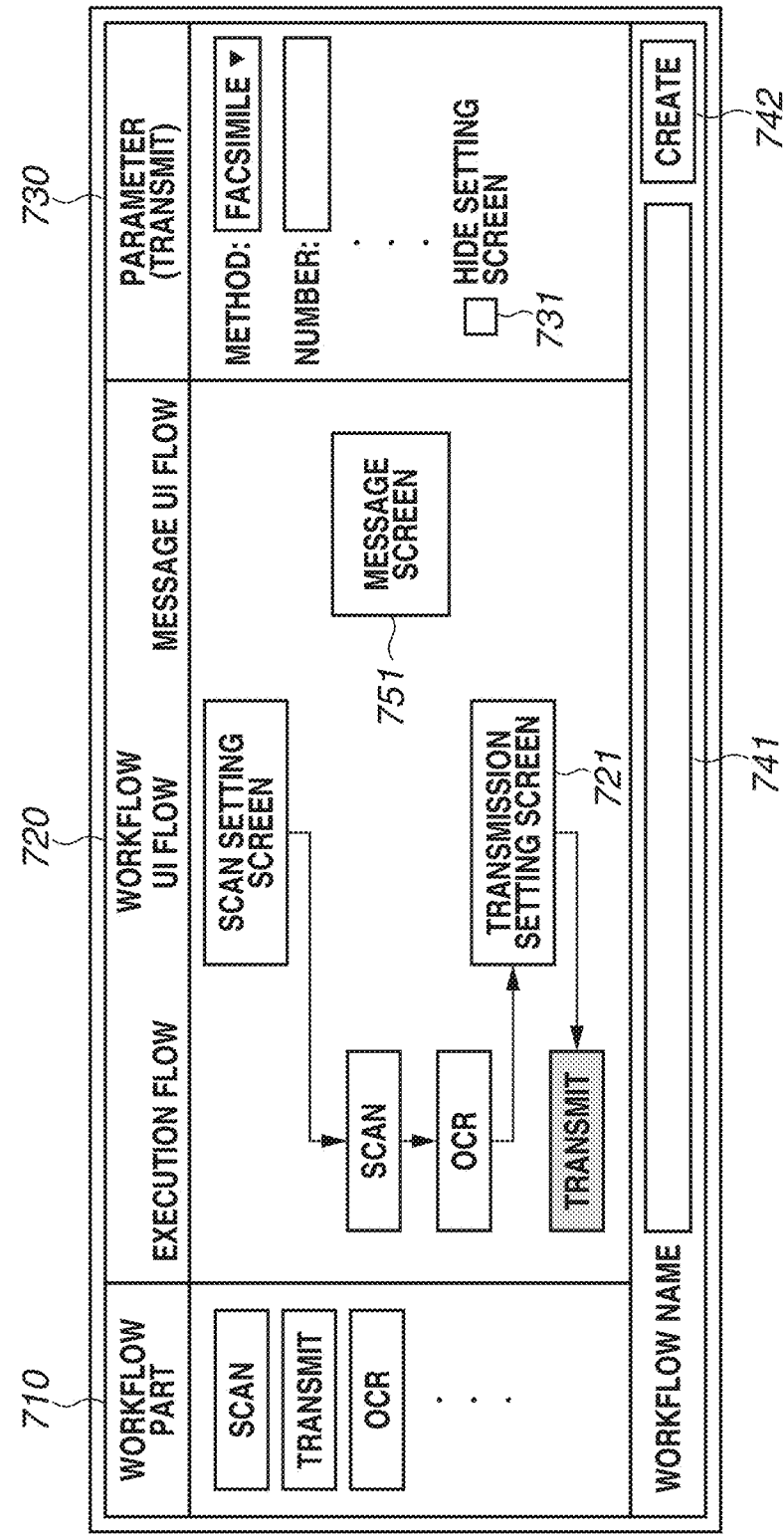
FIG. 9B illustrates an example of the screen on which the flow creation tools are displayed (No. 2).
Figure 9C:
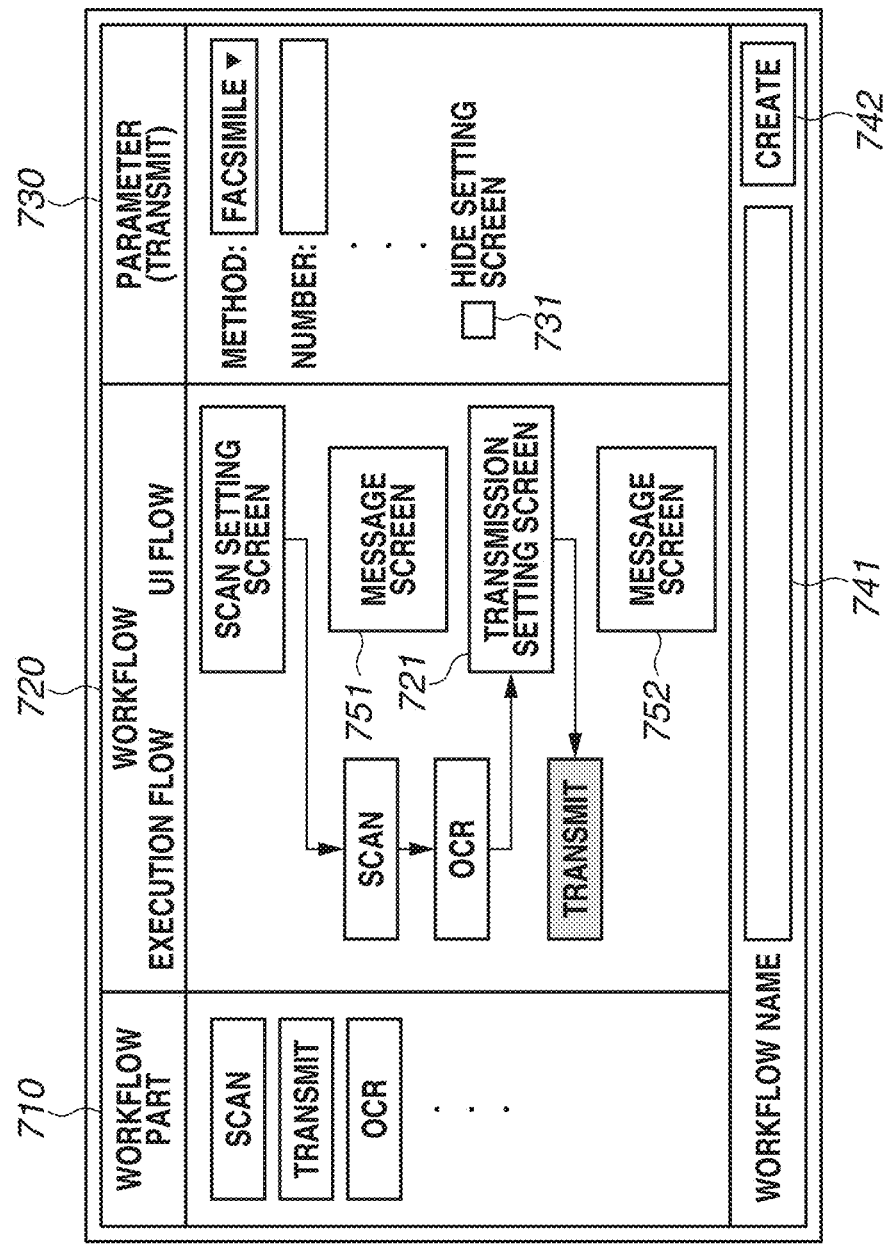
FIG. 9C illustrates an example of the screen on which the flow creation tools are displayed (No. 3).

FIG. 9A illustrates an example of a screen (a workflow creating screen) on which flow creation tools that operate on the PC 103 are displayed. FIGS. 9B and 9C are diagrams illustrating other examples of the workflow creation screen. Specifically, the screen control unit 510 causes the display unit 318 of the PC 103 to display any one of the screens illustrated in FIGS. 9A, 9B, and 9C. Each of the screens in FIGS. 9A, 9B, and 9C is a screen for creating a series of workflow by combining a plurality of function providers of function providers including the setting interface and the execution interface and function providers including only the execution interface.

A region 710 is a region for displaying a list of function providers (function types) defined in the function provider I/F information table 530. FIGS. 9A, 9B, and 9C illustrate individual function providers each represented by parts (buttons or icons), but instead may be represented by another format. The region 710 is an example of a first region for displaying a plurality of function providers.

A region 720 is a region for defining the flow of a workflow. The workflow definition creation unit 520 defines the flow of a workflow in accordance with an operation of selecting function providers necessary for executing the workflow from among the buttons displayed in the region 701 by the creator of the workflow and an operation of arranging the selected function providers in the region 720. For example, the execution flow may be defined in such a manner that the workflow creator drags a button for a desired function provider displayed in the region 710, drops the dragged button at a desired position for defining the execution flow in the region 720, and arranges each function at a desired position (desired order). As described below, when an instruction to display the setting screen for each of the arranged functions is given, the part (button) corresponding to the setting screen of the function is displayed in a UI flow. Referring to FIGS. 9A, 9B, and 9C, the workflow of performing "OCR" and "transmit" after "scan" is defined. In this case, for example, as illustrated in FIG. 9A, the screen control unit 510 distinguishes the execution flow in which the function providers are arranged, from the UI flow representing the display order of the setting screen and the display timing of a message screen 751. Thus, the workflow operation is intuitively indicated to the creator of the workflow. As illustrated in FIG. 9B, the screen control unit 510 may display the setting screen and the message screen 751 in a distinguished manner in the UI flow. With this configuration, a transition of the screen displayed on the operation unit 219 can be intuitively presented to the creator of the workflow. The region 720 is an example of a second region for displaying the calling order of a plurality of function providers selected from the first region.

A region 730 is a region for setting parameters for individual function providers. In the region 730, a parameter setting screen for the selected function provider among the function providers arranged in the region 720 is displayed. Referring to FIGS. 9A, 9B, and 9C, a parameter setting screen for the transmission provider is displayed as an example. A checkbox 731 is present in the region 730. The checkbox 731 represents a setting for preventing the setting screen from being displayed in the MFP 101 when the target function provider is executed by the MFP 101. In the case of executing the workflow, the function provider in which the checkbox 731 is turned on executes the workflow using the setting value set in the region 730, without displaying the setting screen. In FIGS. 9A, 9B, and 9C, the checkbox 731 is turned off, and thus a "transmit" setting screen 721 is displayed in the UI flow of the region 720. The checkbox 731 is displayed only for the function provider including the setting interface. The region 730 is an example of a third region for setting the setting value for the function provider selected from among the plurality of function providers displayed in the second region.

A text field 741 is a region for inputting a workflow name. A button 742 is a button for instructing generation of a workflow definition file.

For example, as illustrated in FIG. 9A, the screen control unit 510 displays the calling order of the execution interfaces of the function providers and the calling order of the setting interfaces of the function providers by using arrows based on whether the plurality of function providers that are selected from the region 710 and arranged in the region 720 include the setting interface, and also based on whether a setting in which the setting screen is not displayed for the function provider including the setting interface set in the region 730 is made. Further, the screen control unit 510 automatically inserts a part (icon) of the message screen 751, which indicates that a message to prompt the user to stand by before the MFP 101 is displayed, between a part of the scan setting screen and a part of the transmission setting screen displayed as the UI flow in the region 720. In the example of FIG. 9A, after the setting is made on the scan setting screen, the transmission setting screen is displayed after the execution of the scan and OCR functions. Accordingly, it takes a long time to display the transmission setting screen after the setting is made on the scan setting screen. A flow definition for displaying a message screen for prompting the user to stand by before the MFP 101 so as to prevent the user from moving away from the MFP 101 during this time is automatically added. The scan setting screen is an example of a first setting screen. The transmission setting screen is an example of a second setting screen.

As illustrated in FIG. 9B, the screen control unit 510 may display a message screen display timing flow (message UI flow) separately from the setting screen calling order flow (UI flow) in the second region.

As illustrated in FIG. 9C, the screen control unit 510 may display a message screen 752 including a message indicating that there is no need to stand by at a timing when there is no need for the user to stand by (a timing when there is no need for the user to make a setting on the setting screen) based on the processing of the plurality of function providers that are selected from the region 710 and placed in the region 720.

In the examples of FIGS. 9A, 9B, and 9C, it is necessary to display the transmission setting screen after obtaining the result of OCR and preliminarily setting the result on the transmission setting screen. For this reason, the display timing of the transmission setting screen 721 is after the timing of displaying the OCR function. However, if such a relationship is not set, e.g., when a setting where the OCR result is not preliminarily set in the address or the like of the transmission setting screen is made, the workflow definition creation unit 520 defines the calling order in such a manner that the setting interface for calling the setting screen is called at an initial position of the workflow. In other words, if the processing result of the previously executed function is not referred to by the setting screen, the setting screen is continuously called at the initial position of the workflow (scan, OCR, and transmit functions are called to be executed after the scan setting screen and the transmission setting screen are continuously called and set at the initial position of the workflow), thereby allowing the MFP 101 to continuously perform the processing of each function even when the user moves away from the MFP 101 after setting each function.

FIG. 10 illustrates a specific description example of a workflow definition file (No. 1). FIG. 10 illustrates an example in which a setting is made as follows using flow creation tools. In the execution flow in the region 720 in FIGS. 9A to 9C, the function providers are arranged in the order of "scan", "OCR", and "transmit". The checkbox 731 is turned off in the setting of each of the scan provider and the transmission provider. The OCR provider includes no setting interface, and thus the checkbox 731 is hidden.

In the present embodiment, the workflow definition file is represented as a file of extensible markup language (XML) format. The format of the workflow definition file is not limited to the XML format, but instead files of other formats may be used.

A workflow tag 810 indicates that the following description is a workflow definition. The name attribute of the workflow tag 810 defines a workflow name, and the input of the text field 741 in FIGS. 9A to 9C is used as an input value.

An FP tag 820 is a subelement of the workflow tag 810 and defines information about the function providers executed in the workflow. The "no" attribute of the FP tag 820 defines the arrangement of the function providers in the workflow, and the values are arranged in an order along the flow of the workflow set in the region 720 in FIGS. 9A to 9C. "no="1"" represents the function provider at the initial position. The "type" attribute of the FP tag 820 defines the function type of each function provider. "type="SCAN"" represents the scan provider.

Similarly, a FP tag 830 defines that the second function provider in the workflow is an OCR provider, and an FP tag 840 defines that the third function provider in the workflow is a transmission provider.

A condition tag 821 is a subelement of the FP tag 820 and defines a search condition for the scan provider.

An Action tag 822 is a subelement of the FP tag 820 and defines information about calling of the function provider interface. The Action tag includes, as subelements, a Parameter tag for a setting to be made during calling, and an Output tag for defining an output of a result of executing "doScan".

The "no" attribute of the Action tag defines the calling order of the function provider interfaces in the entire workflow. The "method" attribute of the Action tag defines the function provider interface to be called. The Action tag 822 defines that the "showSettingUI" interface of the scan provider is first called in the execution of the entire workflow.

The Action tags defined in FIG. 10 are arranged in the order of "no" as follows.
1. The setting interface of the scan provider defined by the Action tag 822.
2. The setting interface of the transmission provider defined by an Action tag 841.
3. The execution interface of the scan provider defined by an Action tag 823.
4. The execution interface of the OCR provider defined by an Action tag 831.
5. The execution interface of the transmission provider defined by an Action tag 842.

In this manner, a definition that the setting interfaces are called prior to the execution interfaces is made separately from the arrangement of the function providers.

FIG. 11 illustrates a specific description example of the workflow definition file (No. 2). FIG. 11 illustrates an example of a case where a setting is made as follows using flow creation tools. The function providers in the execution flow in the region 720 in FIGS. 9A to 9C are arranged in the order of "scan", "OCR", and "transmit". The checkbox 731 is turned on in the setting of the scan provider, and the checkbox 731 is turned off in the setting of the transmission provider.

A workflow tag 910 and FP tags 920, 930, and 940 have definitions that are the same as the definitions of the workflow tag 810 and the FP tags 820, 830, and 840 in FIG. 10, and thus descriptions thereof are omitted.

The Action tags defined in FIG. 11 are arranged in the order of "no" as follows.
1. The setting interface of the transmission provider defined by an Action tag 941.
2. The execution interface of the scan provider defined by an Action tag 921.
3. The execution interface of the OCR provider defined by an Action tag 931.
4. The execution interface of the transmission provider defined by an Action tag 942.

Since the checkbox 731 is turned on in the setting of the scan provider, the setting interface of the scan provider is not defined in the workflow definition file.

FIG. 12 illustrates a specific description example of the workflow definition file (No. 3). FIG. 12 illustrates an example in which a setting is made as follows using flow creation tools. The function providers in the region 720 in FIGS. 9A to 9C are arranged in the order of "scan", "OCR", and "transmit". The checkbox 731 is turned off in the setting of each of the scan provider and the transmission provider. In addition, a setting in which the execution result of the OCR provider is used as a facsimile transmission number is made in the setting of the transmission provider.

A workflow tag 1010 and FP tags 1020, 1030, and 1040 have definitions that are the same as the definitions of the workflow tag 810 and the FP tags 820, 830, and 840 in FIG. 10, and thus descriptions thereof are omitted.

An Output tag 1032 is a subelement of an Action tag 1031 and defines an output of a result of executing "doOCR". The "type" attribute of the Output tag 1032 defines that an output format is "string (character string)", and the "id" attribute of the Output tag 1032 defines that an ID for uniquely specifying output data is "bar".

An input tag 1042 is a subelement of an Action tag 1041 and indicates that data in the format of "string" is received from data having the ID "bar" as a definition about the input of "showSettingUI" of the transmission provider. The data having the ID "bar" is output data "doOCR" defined by the Output tag 1032. In other words, calling of the setting interface of the transmission provider defines that the result of executing the OCR provider is received in the format of string.

A property tag 1043 is a subelement of the Parameter tag and defines an item of a parameter for calling "showSettingUI" of the transmission provider. "FAX_NUMBER" is a parameter corresponding to the transmission facsimile number, and "%bar%" is used as a value. In this case, "%bar%" is a definition that data is replaced by data having the ID "bar" when the function provider interface is called. In other words, the property tag 1043 defines that the result of the OCR provider is preliminarily set as a transmission facsimile number when the setting screen for the transmission provider is displayed.

The Action tags defined in FIG. 12 are arranged in the order of "no" as follows.
1. The setting interface of the scan provider defined by an Action tag 1021.
2. The execution interface of the scan provider defined by an Action tag 1022.
3. The execution interface of the OCR provider defined by the Action tag 1031.
4. The setting interface of the transmission provider defined by the Action tag 1041.
5. The execution interface of the transmission provider defined by an Action tag 1044.

Further, a Panel tag 1046 is a subelement of a Panels tag 1045 and defines a parameter for displaying a message. The display screen defined by the Panel tag continuously displays information defined by the subelement of the Panel tag on the operation unit 219 from the order of the "from" attribute to the middle of the execution of the Action having the "no" attribute with the same value as the "to" attribute. The information about the Panel tag 1046 is an example of display information about a message to prompt the user to stand by until the setting interface of the second function provider is called after the setting interface of the first function provider is called.

In the Panel tag 1046 defined in FIG. 12, "from" attribute="2" and "to" attribute="3" are set. These pieces of information specify the Action tag 1022 having the "no" attribute="2" and the Action tag 1031 having the "no" attribute="3", and define that the message is displayed during execution of the execution interfaces of the Action tags.

The "no" attribute of the Action tag is defined in such a manner that when calling operations of the function provider interfaces have a dependence relationship, the dependence relation is maintained. In the example of FIG. 12, in order to call the setting interface of the transmission provider, the result of calling the execution interface of the OCR provider is required. Accordingly, the "no" attribute is defined so as to maintain the dependence relationship. As illustrated in FIGS. 10 to 12, the calling order is defined for each of the execution interface and the setting interface in the workflow definition file.

FIGS. 13A and 13B are a flowchart illustrating an example of information processing when a workflow definition is created using flow creation tools.

In step S1101, the screen control unit 510 receives an instruction for creating a workflow definition. In this example, function providers are added to the region 720 from the region 710 as illustrated in FIGS. 9A to 9C, and a workflow definition is created again.

In step S1103, the workflow definition creation unit 520 acquires one piece of information about the function providers in the order of function providers arranged as the workflow in the region 720 for flow generation tools. The information acquired in this case includes information defined in the function provider I/F information table 530 and a parameter setting (a setting value in the region 730) for the function providers.

In step S1104, the workflow definition creation unit 520 determines whether information about the function provider is acquired in step S1103 and causes the processing to branch. If there is a function provider about which information is to be acquired and information about the function provider is acquired (YES in step S1104), the processing proceeds to step S1105. If there is no more function provider about which information is to be acquired and information about the function provider is not acquired (NO in step S1104), the processing proceeds to step S1109.

In step S1105, the workflow definition creation unit 520 determines whether the function provider has a setting interface and causes the processing to branch. If the function provider has a setting interface (YES in step S1105), the processing proceeds to step S1106. If the function provider has no setting interface (NO in step S1105), the processing returns to step S1103.

In step S1106, the workflow definition creation unit 520 determines whether the "hide the setting screen" setting (checkbox 731) of the function provider is turned on and causes the processing to branch. If the "hide the setting screen" setting is turned on (YES in step S1106), the processing returns to step S1103. If the "hide the setting screen" setting is turned off (NO in step S1106), the processing proceeds to step S1107.

In step S1107, the workflow definition creation unit 520 determines whether a setting referring to the result of the preceding function provider is included in the parameter setting (the setting value in the region 730) of the function provider and causes the processing to branch. If the setting referring to the result of the preceding function provider is included (YES in step S1107), the processing returns to step S1103. If the setting referring to the result of the preceding function provider is not included (NO in step S1107), the processing proceeds to step S1108. Examples of the setting referring to the result of the preceding function provider include a setting using the execution result of the OCR provider as a facsimile transmission number in the setting of the transmission provider described above with reference to FIG. 12.

In step S1108, the workflow definition creation unit 520 provides the setting interface of the function provider with a calling order ("no" attribute of the Action tag) during execution of the workflow. The workflow definition creation unit 520 counts up the numbers from "1" in the calling order. After the workflow definition creation unit 520 completes the processing of step S1108, the processing returns to step S1103.

In step S1109, the workflow definition creation unit 520 returns the function provider about which information needs to be acquired, to the function provider at the initial position of the workflow.

In step S1110, the workflow definition creation unit 520 acquires one piece of function provider information in the order of arranged function providers of the workflow in the region 720 for flow generation tools. Like in step S1103, the information acquired in this case includes information defined in the function provider I/F information table 530 and the parameter setting of the function provider (the setting value in the region 730).

In step S1111, the workflow definition creation unit 520 determines whether the information about the function provider is acquired in step S1110 and causes the processing to branch. If there is a function provider about which information is to be acquired and information about the function provider is acquired (YES in step S1111), the processing proceeds to step S1112. If there is no more function provider about which information is to be acquired and information about the function provider is not acquired (NO in step S1111), the processing proceeds to step S1120.

In step S1112, the workflow definition creation unit 520 adds the order of function providers in the workflow and the definition of the function provider including the function type ID to the workflow definition.

In step S1113, the workflow definition creation unit 520 determines whether the function provider has a setting interface and causes the processing to branch. If the function provider has a setting interface (YES in step S1113), the processing proceeds to step S1114. If the function provider has no setting interface (NO in step S1113), the processing proceeds to step S1118.

In step S1114, the workflow definition creation unit 520 determines whether the "hide the setting screen" setting (checkbox 731) for the function provider is turned on and causes the processing to branch. If the "hide the setting screen" setting is turned on (YES instep S1114), the processing proceeds to step S1118. If the "hide the setting screen" setting is turned off (NO in step S1114), the processing proceeds to step S1115.

In step S1115, the workflow definition creation unit 520 determines whether there is a setting referring to the result of executing another preceding function provider in the parameter setting (setting value in the region 730) for the function provider, and causes the processing to branch. If there is a setting referring to the result of executing the preceding function provider (YES in step S1115), the processing proceeds to step S1116. If there is no setting referring to the result of executing the preceding function provider (NO in step S1115), the processing proceeds to step S1117.

In step S1116, the workflow definition creation unit 520 provides the setting interface of the function provider with the calling order ("no" attribute of the Action tag) during execution of the workflow. The workflow definition creation unit 520 provides the calling order from a number following the number that has already been given in the previous processing.

In step S1117, the workflow definition creation unit 520 adds a definition for the setting interface of the function provider to the workflow definition. The definition for the setting interface is a definition required during execution of the workflow and includes the calling order during execution of the workflow, the setting interface to be called, and the parameter to be transmitted to the setting interface when the setting interface is called.

In step S1118, the workflow definition creation unit 520 provides the execution interface of the function provider with the calling order ("no" attribute of the Action tag) during execution of the workflow. The workflow definition creation unit 520 provides the calling order in the order from a number following the number that has already been given in the previous processing. In step S1119, the workflow definition creation unit 520 adds the definition about the execution interface of the function provider to the workflow definition. The definition about the execution interface is a definition required during execution of the workflow, and includes the calling order during execution of the workflow, the execution interface to be called, and the parameter to be transmitted to the execution interface when the execution interface is called. After the workflow definition creation unit 520 completes the processing of step S1119, the processing returns to step S1110.

In step S1120, the workflow definition creation unit 520 sets an action for acquiring information at the initial position of the created workflow definition.

In step S1121, one message screen definition is created, and the processing proceeds to step S1122.

In step S1122, the workflow definition creation unit 520 acquires one action in the order of actions of the created workflow definition. In this case, the information to be acquired by the workflow definition creation unit 520 is information about the calling order during execution of the workflow, the setting interface to be called, and the corresponding function provider.

In step S1123, the workflow definition creation unit 520 determines whether the action information is acquired in step S1122 and causes the processing to branch. If the action information is acquired (YES in step S1123), the processing proceeds to step S1124. If there is no more action information to be acquired (NO in step S1123), the processing of the flowchart illustrated in FIGS. 13A and 13B ends.

In step S1124, the workflow definition creation unit 520 determines whether the action is an action for processing the execution interface of the function provider and causes the processing to branch. If the action is an action for processing the execution interface (YES in step S1124), the processing proceeds to step S1125. If the action is an action for processing the setting interface (NO in step S1124), the processing proceeds to step S1128.

In step S1125, the workflow definition creation unit 520 determines whether the value of the "from" attribute is provided to the message definition created in step S1121 and causes the processing to branch. If the value is not provided (NO in step S1125), the processing proceeds to step S1126. If the value is provided (YES in step S1125), the processing proceeds to step S1127.

In step S1126, the workflow definition creation unit 520 provides the value of the action execution order ("no" attribute) acquired in step S1122 to the "from" attribute of the message definition created in step S1121. After the workflow definition creation unit 520 completes the processing of step S1126, the processing returns to step S1122. In step S1127, the workflow definition creation unit 520 provides the value of the action execution order ("no" attribute) acquired in step S1122 to the "to" attribute of the message definition created in step S1121. Further, the workflow definition creation unit 520 creates a message from the function provider name of the action. After the workflow definition creation unit 520 completes the processing of step S1127, the processing returns to step S1122.

In step S1128, the workflow definition creation unit 520 automatically adds the message definition, which is created in step S1121 and is provided with the values of the "from" attribute and "to" attribute in steps S1126 and S1127, to the workflow definition. After the workflow definition creation unit 520 completes the processing of step S1128, the processing returns to step S1121. Based on the message definition added in step S1128, a part (icon) of the message screen 751 is automatically added to the setting screen illustrated in FIG. 9A.

The information processing described above is executed to thereby create the workflow definition using flow creation tools.

Figure 14B:
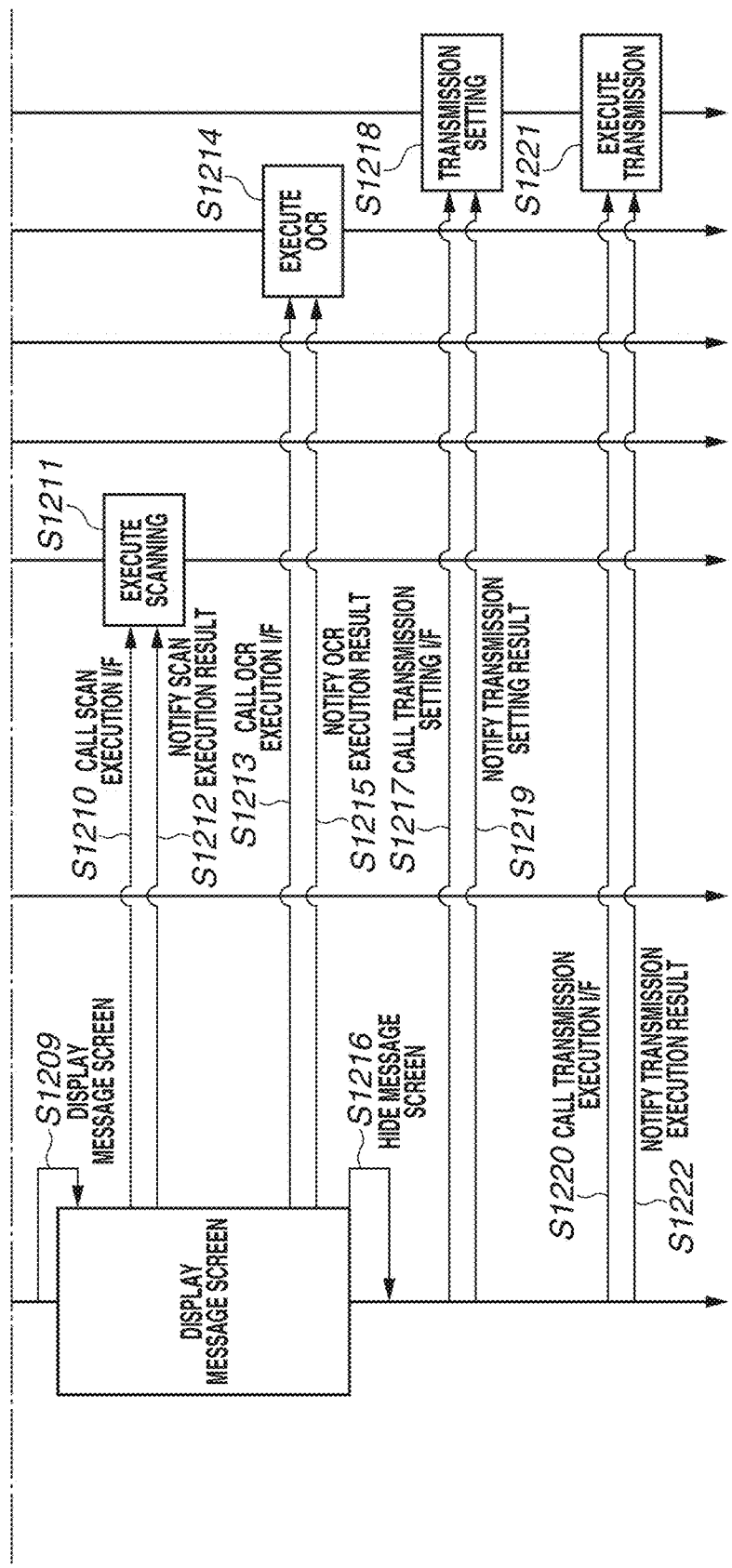
FIG. 14 includes FIGS. 14A and 14B which are a sequence diagram illustrating an example of the flow of executing a workflow on the MFP.

FIGS. 14A and 14B are a sequence diagram illustrating an example of the flow of executing the workflow on the MFP 101. The following steps will be described assuming that the content described above with reference to FIG. 12 is described in the workflow definition file 440.

In step S1201, the workflow processing unit 430 receives a workflow execution instruction from the user via the operation unit 219 or the like.

In step S1202, the workflow processing unit 430 reads the workflow definition file 440 corresponding to the execution instruction.

In step S1203, the workflow processing unit 430 instructs the function provider management unit 420 to search for the function provider described in the workflow definition file 440. In the workflow definition file 440, "a function provider having a function type of scan", "a function provider having a function type of OCR", and "a function provider having a function type of transmit" are described. Accordingly, the workflow processing unit 430 designates the three search conditions to the function provider management unit 420 and instructs the function provider management unit 420 to search for the function provider.

In step S1204, the function provider management unit 420 extracts the function provider that matches the search conditions based on the function provider information table 423. If there is a plurality of scan providers that match the search conditions is present, the function provider management unit 420 sets the scan provider with a highest priority as the search result. In the present embodiment, the normal scan provider 411, the web OCR provider 414, and the transmission provider 415 are extracted.

In step S1205, the function provider management unit 420 notifies the workflow processing unit 430 of the search result of the function provider.

In step S1206, the workflow processing unit 430 calls the setting interface of the normal scan provider 411 in accordance with the calling order ("no" attribute of the Action tag) defined in the workflow definition file 440.

In step S1207, the normal scan provider 411 which has received the calling of the setting interface from the workflow processing unit 430 displays the scan setting screen on the operation unit 219 of the MFP 101 in accordance with an instruction.

In step S1208, the normal scan provider 411 notifies the workflow processing unit 430 of the scan setting result.

In step S1209, the workflow processing unit 430 displays the message screen on the operation unit 219 of the MFP 101 in accordance with the message screen definition (Panel tag) defined in the workflow definition file 440.

In step S1210, the workflow processing unit 430 calls the execution interface of the normal scan provider 411 in accordance with the calling order defined in the workflow definition file 440.

In step S1211, the normal scan provider 411 which has received the calling of the execution interface from the workflow processing unit 430 executes scan processing in accordance with an instruction.

In step S1212, the normal scan provider 411 notifies the workflow processing unit 430 of the scan processing result.

In step S1213, the workflow processing unit 430 calls the execution interface of the web OCR provider 414 in accordance with the calling order defined in the workflow definition file 440.

In step S1214, the web OCR provider 414 which has received the calling of the execution interface from the workflow processing unit 430 executes OCR processing in accordance with an instruction.

In step S1215, the web OCR provider 414 notifies the workflow processing unit 430 of the OCR processing result.

In step S1216, the workflow processing unit 430 hides the message screen in accordance with the message screen definition (Panel tag) defined in the workflow definition file 440.

In step S1217, the workflow processing unit 430 calls the setting interface of the transmission provider 415 in accordance with the calling order defined in the workflow definition file 440.

In step S1218, the transmission provider 415 which has received the calling of the setting interface from the workflow processing unit 430 displays the transmission setting screen on the operation unit 219 of the MFP 101 in accordance with an instruction.

In step S1219, the transmission provider 415 notifies the workflow processing unit 430 of the transmission setting result.

In step S1220, the workflow processing unit 430 calls the execution interface of the transmission provider 415 in accordance with the calling order defined in the workflow definition file 440.

In step S1221, the transmission provider 415 which has received the calling of the execution interface from the workflow processing unit 430 executes transmission processing in accordance with an instruction.

In step S1222, the transmission provider 415 notifies the workflow processing unit 430 of the transmission processing result.

According to the present embodiment, in the case of creating a workflow by combining a plurality of pieces of software or extension software, the workflow can be defined in such a manner that a message screen for appropriately prompting the user to stand by is displayed when nothing is displayed on the setting screen, in a case where the creator of the workflow is not aware of the calling order of the setting screen and the display interval of the setting screen prepared using software or extension software. Therefore, the definition file for the workflow that facilitates the user to determine whether there is a need to stand by can be created. A part or the whole of the software configuration of the MFP 101 described above may be implemented as a hardware configuration on the MFP 101. Similarly, a part or the whole of the software configuration of the PC 103 may be implemented as a hardware configuration on the PC 103. The number of hardware configurations of the MFP 101, such as a CPU, a ROM, a RAM, an HDD, and a network I/F, is not limited to one. The functions and the like of the MFP 101 may be implemented in such a manner that a plurality of CPUs execute processing while using data or the like stored in a plurality of RAMs, ROMs, or HDDs, based on programs. The same holds true for the PC 103.

Further, a Graphics Processing Unit (GPU) may be used in place of a CPU as a hardware configuration of each apparatus.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2017-089960, filed Apr. 28, 2017, which is hereby incorporated by reference herein in its entirety.

What is claimed is:

1. An information processing apparatus comprising:
one or more processors; and
memory storing instructions that, when executed by the one or more processors, cause the information processing apparatus to perform operations including:
displaying a creation screen for a creator to create a workflow by combining a plurality of function providers based on an operation, by the creator, of arranging the plurality of function providers in the creation screen, wherein the plurality of function providers includes a function provider having a setting interface to call a setting screen to perform a setting of a corresponding function, and an execution interface to execute the corresponding function, and
automatically adding, without an operation by the creator for adding display information, the display information to the workflow displayed in the creation screen in a case where a setting interface of a function provider, which has been added to the workflow in the creating screen by the creator, refers to a result of an execution by an execution interface of a preceding function provider in the workflow,
wherein the display information automatically added is information to display a message to prompt a user to standby during the execution by the execution interface of the preceding function provider included in the created workflow when the created workflow is executed by the user.

2. The information processing apparatus according to claim 1, wherein displaying includes displaying, on the creation screen and based on a calling order, parts corresponding to the setting interface of each of the plurality of function providers used for the workflow and parts corresponding to the execution interface of each of the plurality of function providers used for the workflow.

3. The information processing apparatus according to claim 2, wherein executing the instructions causes the information processing apparatus to perform operations including controlling parts corresponding to the display information automatically added to the workflow to be displayed on the creation screen.

4. The information processing apparatus according to claim 3, wherein executing the instructions causes the information processing apparatus to perform operations of including in the creation screen:
a first region to display a list of selectable function providers,
a second region to display, based on the calling order, (i) the parts corresponding to the setting interface of each of the plurality of function providers used for the workflow, (ii) the parts corresponding to the execution interface of each of the plurality of function providers used for the workflow, and (iii) the parts corresponding to the display information, and
a third region to perform a setting of the setting screen for a function provider selected from among the plurality of function providers used for the workflow.

5. The information processing apparatus according to claim 3, wherein displaying includes displaying, on the creation screen, a first flow in which the parts corresponding to the execution interface are arranged, and a second flow in which the parts corresponding to the setting interface and the parts corresponding to the display information are arranged.

6. The information processing apparatus according to claim 3, wherein displaying includes displaying, on the creation screen, a first flow in which the parts corresponding to the execution interface are arranged, a second flow in which the parts corresponding to the setting interface are arranged, and a third flow in which the parts corresponding to the display information are arranged.

7. The information processing apparatus according to claim 1, wherein executing the instructions causes the information processing apparatus to perform operations including:
defining a calling order in such a manner that the setting interface is called after the execution interface of the other preceding function provider when the setting interface of the function provider added to the workflow refers to a result of the execution by the execution interface of the other preceding function provider, and defining a calling order in such a manner that the setting interface is called prior to the execution interface of the other preceding function provider when the setting interface of the function provider added to the workflow does not refer to a result of the execution by the execution interface of the other preceding function provider.

8. A method for an information processing apparatus, the method comprising:

displaying a creation screen for a creator to create a workflow by combining a plurality of function providers based on an operation, by the creator, of arranging the plurality of function providers in the creation screen, wherein the plurality of function providers includes a function provider having a setting interface to call a setting screen to perform a setting of a corresponding function, and an execution interface to execute the corresponding function; and automatically adding, without an operation by the creator for adding display information, the display information to the workflow displayed in the creation screen in a case where a setting interface of a function provider, which has been added to the workflow in the creating screen by the creator, refers to a result of an execution by an execution interface of a preceding function provider in the workflow, wherein the display information automatically added is information to display a message to prompt a user to standby during the execution by the execution interface of the preceding function provider included in the created workflow when the created workflow is executed by the user.

9. The method according to claim 8, wherein displaying includes displaying includes displaying, on the creation screen and based on a calling order, parts corresponding to the setting interface of each of the plurality of function providers used for the workflow and parts corresponding to the execution interface of each of the plurality of function providers used for the workflow.

10. The method according to claim 9, further comprising controlling parts corresponding to the display information automatically added to the workflow to be displayed on the creation screen.

11. The method according to claim 10, further comprising including in the creation screen:

a first region to display a list of selectable function providers, a second region to display, based on the calling order, (i) the parts corresponding to the setting interface of each of the plurality of function providers used for the workflow, (ii) the parts corresponding to the execution interface of each of the plurality of function providers used for the workflow, and (iii) the parts corresponding to the display information, and a third region to perform a setting of the setting screen for a function provider selected from among the plurality of function providers used for the workflow.

12. The method according to claim 10, wherein displaying includes displaying, on the creation screen, a first flow in which the parts corresponding to the execution interface are arranged, and a second flow in which the parts corresponding to the setting interface and the parts corresponding to the display information are arranged.

13. The method according to claim 10, wherein displaying includes displaying, on the creation screen, a first flow in which the parts corresponding to the execution interface are arranged, a second flow in which the parts corresponding to the setting interface are arranged, and a third flow in which the parts corresponding to the display information are arranged.

14. The method according to claim 8, further comprising:

defining a calling order in such a manner that the setting interface is called after the execution interface of the other preceding function provider when the setting interface of the function provider added to the workflow refers to a result of the execution by the execution interface of the other preceding function provider; and defining a calling order in such a manner that the setting interface is called prior to the execution interface of the other preceding function provider when the setting interface of the function provider added to the workflow does not refer to a result of the execution by the execution interface of the other preceding function provider.

15. A non-transitory computer-readable storage medium storing a program to cause an information processing apparatus to perform a method, the method comprising:

displaying a creation screen for a creator to create a workflow by combining a plurality of function providers based on an operation, by the creator, of arranging the plurality of function providers in the creation screen, wherein the plurality of function providers includes a function provider having a setting interface to call a setting screen to perform a setting of a corresponding function, and an execution interface to execute the corresponding function; and automatically adding, without an operation by the creator for adding display information, the display information to the workflow displayed in the creation screen in a case where a setting interface of a function provider, which has been added to the workflow in the creating screen by the creator, refers to a result of an execution by an execution interface of a preceding function provider in the workflow, wherein the display information automatically added is information to display a message to prompt a user to standby during the execution by the execution interface of the preceding function provider included in the created workflow when the created workflow is executed by the user.

* * * * *